July 21, 1970 C. A. WALTON 3,521,141

LEAKAGE CONTROLLED ELECTRIC CHARGE SWITCHING AND STORING CIRCUITRY

Filed Oct. 30, 1967

*INVENTOR*
CHARLES A. WALTON

BY [signature]

ATTORNEY

United States Patent Office 3,521,141
Patented July 21, 1970

3,521,141

LEAKAGE CONTROLLED ELECTRIC CHARGE SWITCHING AND STORING CIRCUITRY

Charles A. Walton, Los Gatos, Calif., assignor to International Business Machines Corporation, Armonk, N.Y., a corporation of New York Filed Oct. 30, 1967, Ser. No. 678,896
Int. Cl. H03k *17/60, 5/20;* H01l *11/14*
U.S. Cl. 320—1 17 Claims

ABSTRACT OF THE DISCLOSURE

Leakage from a storage capacitor to a charge source through a semiconductor device static switching arrangement is reduced and maintained substantially constant over the range of charge stored in the capacitor. A resistor is connected from an element in circuit with and following the voltage on the storage capacitor to a point of the switching arrangement intermediate the capacitor and the charge source. When the static switching arrangement is in the open circuit condition, the intermediate point lies in the leakage path and is brought to a potential nearly equal to the charge stored on the capacitor. Thus the leakage potential is low and substantially the same for all values of charge for which the circuit is designed. The circuit can then be calibrated for this substantially constant leakage factor. Single and dual field effect transistor switching arrangements are exemplified. Advantageous charge following circuitry is suggested.

This application is directed to the same general field of the electrical switching art as the copending U.S. application Ser. No. 604,942 of John W. Beck and Charles J. Steele, filed on Dec. 27, 1966, thereafter issued on Aug. 26, 1969, as U.S. Pat. No. 3,463,993, for High Speed-High Impedance Electrical Switch and assigned to the International Business Machines Corporation.

The invention relates to semiconductor switching circuitry, and it particularly pertains to high speed, high impedance switching devices of the static type for electric charge storage circuitry.

In applications such as the computer control of physical processes, analog voltages are utilized to operate process controlling devices. It is frequently necessary to sense those voltages in very short time intervals and to store them in a plurality of charge storage elements until the next sensing interval occurs. Present day process control technology generally uses a digital computer in sensing the analog voltages and multiplexing them into the charge storage elements. That multiplexing operation requires switching circuitry.

To make efficient use of the associated digital computer, the switching circuitry should operate at as high a speed and as reliably as possible. Furthermore, the switching circuitry must not contribute to the leaking away of the stored charge.

A solid state switch by itself offers high switching speeds, but lacks the necessary charge isolation. An electromechanical switch provides the necessary charge isolation during a computer failure, but its switching speed is slower than that of a solid state switch. Its failure-free life is lower, also.

Prior art solutions to this problem have been generally complex and expensive or unsatisfactory in other respects. For example, they have included the provision of electromechanical switching along with semi-conductor switching as disclosed in the above mentioned application Ser. No. 604,942. The solid state switch is rendered conductive in order to transfer an analog voltage from an analog voltage source, through a conducting electromechanical switch, to an associated charge storage circuit, thereby accomplishing the switching at a high speed. The solid state switch is then rendered nonconductive, and prevents leakage of the charge from the charge storage circuit for a brief time. Should the solid state switch be rendered completely inoperative for a longer time for any reason the electromechanical switch is opened. A high impedance leakage path is thereby presented to the charge storage circuitry, and the charge is maintained in an essentially undiminished state on that charge storage circuitry for a relatively long time. The latter approach is characterized by high cost due to the cabling necessary to accommodate for the electromechanical switch. Furthermore, it is bulky and more difficult to package.

Other prior art arrangements of interest with respect to charge storage circuitry are disclosed in the following U.S. Patents: 2,902,674, September 1959, Billings et al., 340—173; 3,014,169, December 1961, MacIntyre, 320—1; 3,105,230, September 1963, MacIntyre, 340—347; 3,161,858, December 1964, Sanders et al., 340—173; 3,211,984, October 1965, Jones, 320—1.

According to the invention, the objects indirectly referred to hereinbefore and which will appear as the specification progresses are attained in an electric charge storage circuit wherein a charge storing device is charged by a solid state switching arrangement occupying at least a part of a leakage path tending to dissipate the charge on the device and the leakage drop is maintained substantially constant over the range of charge stored in the device by means of an electric connection between charge following circuitry connected to the device and an intermediate point in the leakage path of the switching arrangement.

In one example of circuitry according to the invention, charge translating circuitry comprises a pair of semi-conductor switching devices connected in series circuit with a charge storage device across a source of potential to be stored cyclically in the storage device. Charge following circuitry coupled to the charge storage device delivers a voltage proportional to the stored charge to a utilization circuit. An electric connection is then made between a point in the charge following circuitry and the junction between the pair of semi-conductor devices. The point in the charge following circuitry has a value of potential proportional to the value of charge on the device. The proportion in practice is unity$\pm$5%. A current limiting element is interposed in the electric connection for preventing the potential to be stored from being dissipated when it is being applied to the charge storing device.

In another example, a single semi-conductor switching device is used and the current limiting element is brought to the substrate element of the single device.

In the practical examples described hereinafter, a capacitor is suggested for the charge storage device and field effect transistors (FET's) of several types are described in connection with the advantageous characteristics for which they are known.

It should be understood that the novel circuitry, according to the invention, differs in important respects from the prior art feedback circuitry used to linearize charging of capacitors and the like. The circuitry, according to the invention, leaves the charging function completely free and unhindered. It is concerned with establishing a leakage eliminating voltage on the static type switching circuitry and stabilizing the voltage drop of that portion of the conventional switching circuitry where the leakage normally occurs.

In order that full advantage of the invention may be obtained in practice, preferred embodiments thereof, given by way of examples only, are described in detail hereinafter with reference to the accompanying drawing, forming a part of the specification and in which.

Figure 1:
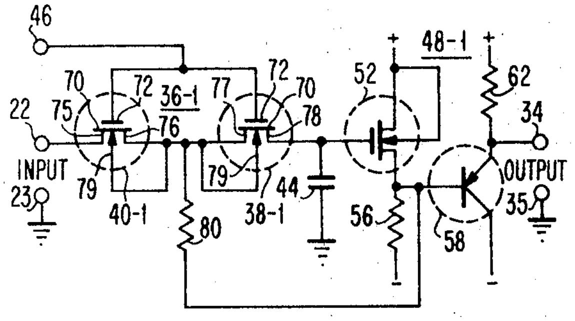
FIG. 1 depicts circuitry basic to the invention.

In FIG. 1 the basic circuitry according to the invention is shown between a pair of input terminals 22, 23 and a pair of output terminals 34, 35. A source of voltage to be sampled is connected to the input terminals 22, 23. This source has an impedance sufficiently low as to form a heavy drain on the circuit following once the sampling is completed or circuit failure occurs.

Switching transistor circuitry 36–1 comprising solid state switching devices or field effect transistors (FET's) 38–1, 40–1 connect the input terminals 22, 23 to a charge storing capacitor 44. The switching function, operating in time periods of the order of microseconds, is controlled by a substantially square wave potential of about 40 volts applied between a switching terminal 46 and a point of reference potential, such as at the terminal 23. Positive or negative switching potential is applied depending on whether the FET's are P-type or N-type devices. The capacitor 44 is connected to the output terminals 34, 35 by charge repeating circuitry 48–1. The latter comprises a charge repeating transistor 52, an associated load resistor 56, an amplifier transistor 58, and an associated load resistor 62.

The switching transistors 38–1 and 40–1 comprise substrate elements 70 and gate electrode elements 72 and other elements. A drain electrode element 75 of the input switching transistor 40–1 is connected to the input terminal 21. The source electrode element 76 and 77 of the transistors 40–1 and 38–1 respectively are connected on common element 77 of the other switching transistor 38–1. The capacitor 44 is connected to the drain electrode 78 to complete the charge switching circuit. Substrate electrodes 79 are connected to the respective source electrodes 76 and 77 as shown.

A high impedance current limiting resistance element 80 is connected between the junction of charge following transistors 52 and 58 and the junction between switching transistors 38 and 40 comprising a static type switch arrangement as opposed to a dynamic type switch arrangement. In this manner the voltage developed across the load resistor 56 following the charge in the capacitor 44 is brought to the source electrode elements 76 and 77 of the switching transistors. When the switching potential is high at the terminal 46, the charge applied to the capacitor 44 by the switching transistors 38, 40 in the low impedance mode is substantially unaffected by the circuit comprising the resistance element 80 because the high impedance thereof renders it an isolation element. When the switching transistors 38, 40 are open the relatively high impedance thereof tends to isolate the capacitor 44 from the low impedance path at the input terminals 22, 23. This isolation is satisfactory for a relatively short time period at best. According to the invention, the stored reference voltage return lead incorporating the isolation resistance element 80 extends the satisfactory charge level retaining time period substantially indefinitely. This is brought about by the fact that in the circuitry shown the voltages on the source electrode element 77 and on the drain electrode element 78 of the switching transistor 38–1 are substantially the same, or at least they differ by a substantially low value, the gate-to-source voltage of the follower FET 52, over the range of voltages for which the circuitry is designed to operate. Thus substantially no voltage is permitted to leak off the capacitor 44 or the low value of leakage is held constant and the circuitry is readily calibrated for the low leakage actually encountered.

Because two semi-conductor switching devices have been used in prior art arrangements of this kind, the advantages of the invention are afforded at the expense of a single isolation resistance element 80. Further, with reference to the aforementioned copending U.S. patent application Ser. No. 604,942, a savings is effected because of the difference in cost between an electromechanical switch and that of a resistor.

The value of the resistance element 80 is not critical as it need pass only a small trickle of current for establishing the isolation voltage in the switching circuitry and it need be only high enough not to shunt the source during intentional charging of the storage capacitor 44. A value of 1 to 2 megohms has proved satisfactory.

As shown and thus far described the source-to-drain leakage of the series switching FET 38 is reduced to the very small value of $V_{gs}$ of the follower FET 42 and is held substantially constant. A lower voltage can be taken from the charge repeating circuit by means of voltage translation diodes and/or potentiometers. A slightly positive or a slightly negative voltage may be applied to the series switching FET 38 to overcome any natural tendency of the storage circuitry to rise or fall.

Figures 2, 4:
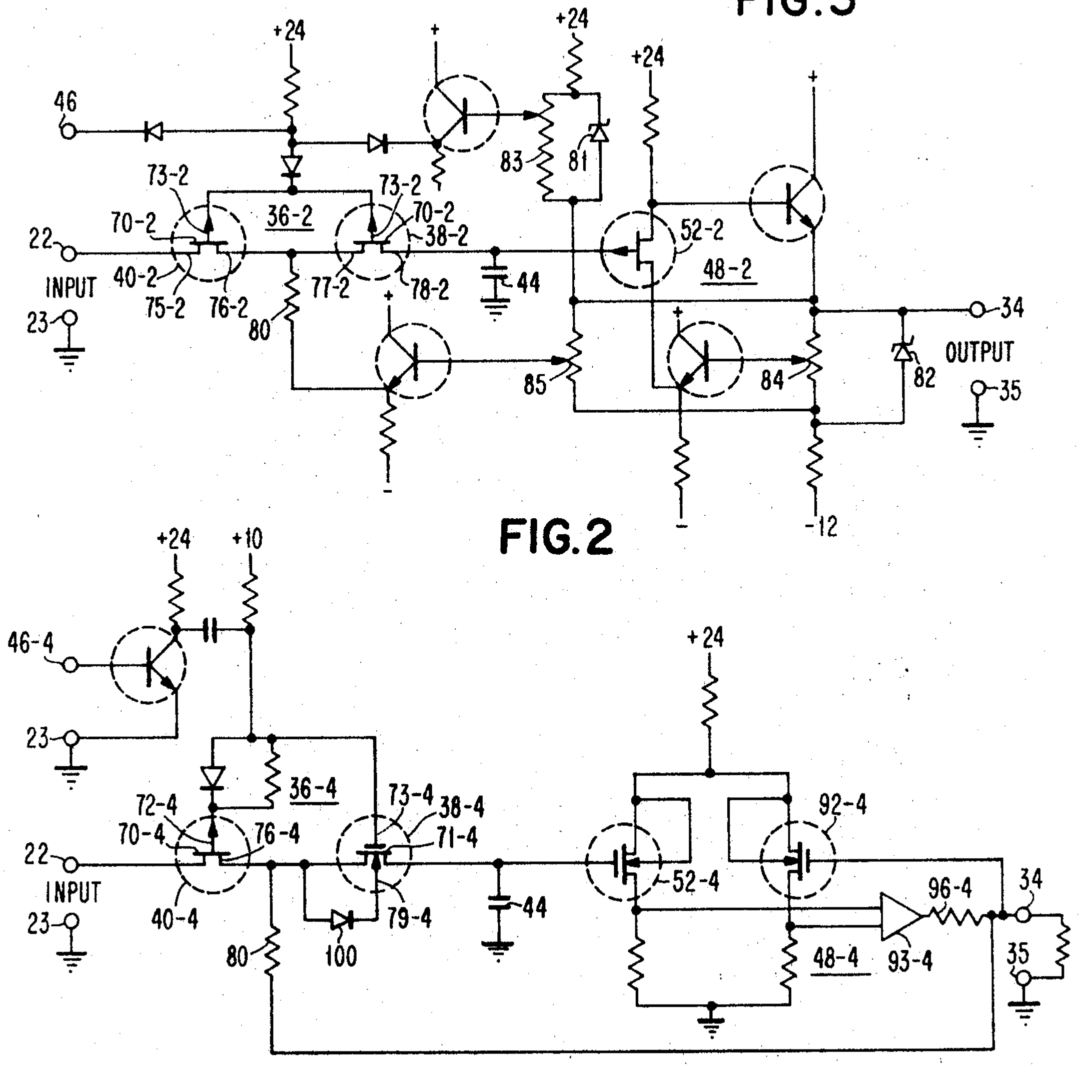
FIG. 2 is a schematic diagram of a circuit according to the invention using junction type transistors throughout.
FIG. 4 is an illustration of circuitry realizing the full advantages of the invention.

FIG. 2 shows circuitry implementing junction field effect transistors (JFET's). For controlled leakage currents the gate electrode of a JFET 38–2 and the drain electrode 76–2 of a JFET 40–2 must also follow the storage capacitor voltage. The voltage on the capacitor is also repeated across Zener diodes 81 and 82. Potentiometers 83 and 84 allow selection of the offset levels of the gate electrode of the FJET 38–2 and the drain electrode of the JFET 40–2. The value of the isolating voltage may also be adjusted by another potentiometer 85. All of the circuit points around the storage capacitor 44 follow the capacitor voltage and the sum of all leakage currents in and out of the capacitor is held low and constant. Only the leakage of the capacitor 44 itself is not regulated but this is compensated for at least to a first approximation.

Figure 3:
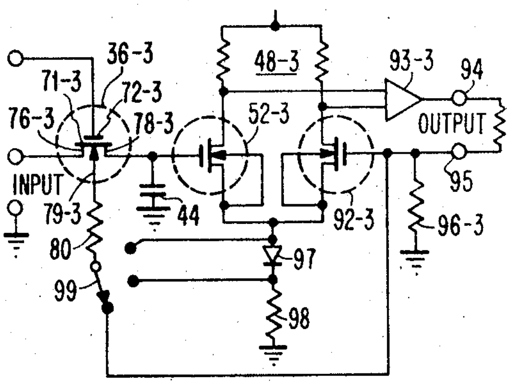
FIG. 3 is a schematic diagram of a simple circuit according to the invention.

A single insulated gate field effect transistor (IGFET) 38–3 performs the switching function in the arrangement of FIG. 3. This circuit is based on the fact that when the substrate element 71–3 of the IGFET 38–3 is biased off, the source electrode 76–3 and the drain electrode 78–3 are quite completely isolated. Variations of the input voltage do not disturb the voltage on the capacitor 44 except during intentional charge storing periods. By applying an isolating voltage to the substrate element 71–3, very nearly equal to the stored charge, the discharge of the storage capacitor 44 is held extremely low. This circuit has the advantage of requiring a power supply of but one polarity, in this instance a positive supply with respect to ground reference potential. The output amplifier 48–3 is of the differential type including an additional IGFET 92–3 driving and the amplifier stage 93. This arrangement offers the advantages of largely compensating for gate-to-source voltage changes and low output impedance. The output terminals 94, 95 are both removed from ground by a feedback resistor 96–3. The isolating voltage applied by means of the return resistor 80 may be that obtained across the feedback resistor 96–3 or that across a diode 97 and a resistor 98 or that from the latter only as determined by the setting of a switch 99.

A circuit that is superior in performance and lower in cost than the others is shown in FIG. 4. A JFET 40–4 and an IGFET 38–4 are in the switching circuit. They are switched on together during loading time by switching potential applied at terminals 46–4 and 23. When the two transistors are in the Off mode, no gate electrode 72–4 current will reach the storage capacitor 44. The isolation voltage applied by the resistor 80 will prevent source-to-drain current through the IGFET 38–4 to the storage capacitor 44. The JFET 40–4 is sufficient to isolate the voltage variations that appear at the input terminals 22, 23 during this non-sampling time period. The current from the gate electrode 72–4 to the source electrode 76–4 is low in value and discharged to ground through the isolation resistor 80 with a negligibly low voltage developed across the latter. This circuit has output terminals 34, 35 capable of being referenced to ground as shown. A diode 100 lowers the leakage of the IGFET 38–4.

Experimental results show less drift with these circuits than the accepted 1% per hour standard. The advantages of the invention lie chiefly in the elimination of relay contact bounce, greater reliability, greater speed, and greater life than obtainable with the prior art arrangements. The costs will be lower than any present prior art arrangement especially as the price of FET's drops and the operating power requirement already is lower.

While the invention has been shown and described particularly with reference to preferred embodiments thereof, and various alternatives have been suggested, it should be understood that those skilled in the art may effect still further changes without departing from the spirit and the scope of the invention as defined hereinafter.

The invention claimed is:

1. An electric charge storage circuit including,
input terminals,
output terminals,
an insulated gate field effect transistor,
having source, drain and gate electrode elements, and a substrate element,
the source electrode element of said transistor being connected to one of said input terminals,
a charge storing capacitor connected between the drain electrode of said transistor and the other of said input terminals,
terminals connected to said gate electrode element for applying switch controlling potential to said transistor to close and open the circuit between said capacitor and said input terminals,
a pair of insulated gate field effect transistor devices,
each of said transistor devices having source, drain and gate terminals,
electric connections to said source and drain terminals and impedance elements forming a differential follower circuit,
electric connections between said capacitor and the gate terminal of one of said transistor devices and between said output terminals and the gate terminal of the other of said transistor devices,
a differential input-single ended output amplifier connected to said differential follower circuit and one of said output terminals,
a feedback resistor connected between the other of said output terminals and one of said components of said differential follower circuit, and
a resistance element connected between an element of said follower circuit and said substrate element of said insulated gate field effect transistor.

2. An electric charge storage circuit including,
input terminals,
output terminals,
a charge storing device,
charge repeating circuitry connected between said charge storing device and said output terminals for delivering a potential thereto proportional to the charge stored in said charge storing device,
switching transistor circuitry connected between said input terminals and said charge storing device for applying a charge thereto,
said switching transistor circuitry normally contributing to deleterious leakage from said charge storing device to said input terminals, and
said switching circuitry comprising a plurality of transistor elements including two electrode elements individually connected to said input terminals and to said charge storing device, a substrate element, and at least one other transistor element,
an electric connection between said charge repeating circuitry and at least one of said transistor elements of said switching transistor circuitry other than said two electrode elements,
whereby said leakage is reduced and maintained substantially constant over the range of charge stored in said charge storing device.

3. An electric charge storing circuit as defined in claim 2 and wherein said charge repeating circuitry and said switching transistor circuitry comprise field effect transistors.

4. An electric charge storing circuit as defined in claim 3 and wherein
said switching transistor circuitry comprises an insulated gate field effect transistor having source, drain, and gate electrode elements and a substrate element,
said two electrode elements comprise said source and drain electrode elements, and
said electric connection is made to said substrate element.

5. An electric charge storing circuit as defined in claim 2 and wherein
said switching circuitry comprises two field effect transistors each having source, drain and gate electrode elements,
said two electrode elements comprise the drain electrode elements of said two field effect transistors,
said source electrode elements are interconnected, and
said electric connection is made to one of said source electrode elements.

6. An electric charge storing circuit as defined in claim 5 and wherein one of said field effect transistors is a junction field effect transistor and one is an insulated gate field effect transistor.

7. An electric charge storing circuit as defined in claim 2 and wherein a resistor is interposed in said electric connection.

8. An electric charge storing circuit as defined in claim 7 and wherein a transistor is interposed in said electric connection.

9. An electric charge storing circuit including,
input terminals,
output terminals,
a charge storing capacitor,
charge following transistor circuitry connected between said capacitor and said output terminals for producing a potential thereat proportional to the charge stored in said capacitor,
an insulated gate field effect transistor having at least a substrate element,
a source electrode element connected to one of said input terminals,
a drain electrode element connected to said capacitor, and
a gate element to which a switching potential is applied for switching said transistor on and off,
said transistor normally contributing to deleterious leakage from said capacitor to said input terminals in the off condition of said transistor, and
a resistance element connected betwen said charge following transistor circuitry and said substrate element,
thereby reducing said leakage and maintaining the same substantially constant over the range of charge stored in said capacitor.

10. An electric charge storing circuit as defined in claim 9 and wherein
said charge following transistor circuitry comprises
an insulated gate field effect transistor having a gate element coupled to said capacitor and another electrode element and a resistive element effectively shunting said capacitor for producing said proportional potential.

11. An electric charge storing circuit as defined in claim 10 and wherein
said charge following circuitry comprises another insulated gate field effect transistor connected to the first insulated gate field effect transistor forming a differential voltage translating circuit, and
a feedback connection from said output terminals to the gate element of said other transistor.

12. An electric charge storing circuit including,
input terminals,
output terminals,
a charge storing capacitor,
a pair of field effect transistors having source electrode elements connected in common,
drain electrode elements, and
gate elements coupled in common,
one of said drain electrode elements being connected to one of said input terminals and
the other of said drain electrode elements being connected to said capacitor,
thereby forming a charging circuit normally having a deleterious leakage from said capacitor to said input terminals in the non-conducting condition of said transistors,
another field effect transistor having
a gate element connected to said capacitor, and
another electrode element and at least one element forming a load element effectively shunting said capacitor for producing a potential following the voltage on said capacitor, and
circuitry including a resistance element coupled to said load element and to said common connection of said source electrode elements for applying said following potential thereto.

13. An electric charge storing circuit as defined in claim 12 and wherein
said transistors are junction field effect transistors,
a junction transistor amplifier is interposed in circuit with said resistance element,
another junction transistor amplifier is connected between said coupling to said load element and said gate elements coupled in common.

14. An electric charge storing circuit as defined in claim 13 and wherein
said coupling is made in another amplifier stage having
a junction transistor with the base coupled to a drain or source electrode element of said other field effect transistor has the emitter connected to said load element,
said load element comprises three potentiometers effectively connected in parallel,
a further junction transistor is coupled between said load element and the source or drain electrode element of said other field effect transistor, and
the arms of said potentiometers are individually connected to the bases of said junction transistors.

15. An electric charge storing circuit as defined in claim 12 and incorporating
a further field effect transistor coupled in differential amplifier circuit configuration to said other field effect transistor, and
a feedback voltage from one of said output terminals is applied to the gate element of said further transistor.

16. An electric charge storing circuit as defined in claim 15 and incorporating an amplifier circuit interposed between said differential amplifier circuit configuration and one of said output terminals.

17. An electric charge storage circuit including,
input terminals,
output terminals,
a junction field effect transistor,
an insulated gate field effect transistor,
each of said transistors having source, drain and gate electrode elements,
the drain electrode element of said junction field effect transistor being connected to one of said input terminals,
a connection between the source electrode elements of said field effect transistors,
a charge storing capacitor connected between the drain electrode of said insulated gate field effect transistor and the other of said input terminals,
a junction transistor having base, emitter and collector electrodes,
electric coupling between said collector electrode and said gate electrode elements,
terminals connected to said base and emitter electrodes for applying switch controlling potential to said field effect transistors to close and open the circuit between said capacitor and said input terminals,
a pair of insulated gate field effect transistor devices,
each of said transistor devices having source, drain and gate terminals,
electric components connected to said source and drain terminals including impedance elements forming a differential follower circuit,
electric connections between said capacitor and the gate terminal of one of said transistor devices and between said output terminals and the gate terminal of the other of said transistor devices,
a differential input-single ended output amplifier connected between said differential follower circuit and one of said output terminals, and
a resistance element connected between said one output terminal and said connection between said source electrode elements of said junction field effect and said insulated gate field effect transistors.

References Cited

UNITED STATES PATENTS

| | | | |
|---|---|---|---|
| 3,075,086 | 1/1963 | Mussard | 320—1 X |
| 3,393,325 | 7/1968 | Borror et al. | 307—246 X |
| 3,395,291 | 7/1968 | Bogert | 307—246 X |
| 3,406,346 | 10/1968 | Wanlass | 307—304 X |
| 3,413,491 | 11/1968 | Reeves et al. | 307—304 X |
| 3,430,072 | 2/1969 | Stevens | 328—151 X |

BERNARD KONICK, Primary Examiner

J. F. BREIMAYER, Assistant Examiner

U.S. Cl. X.R.

307—246, 251, 304; 328—151; 340—173